United States Patent
Taylor et al.

(10) Patent No.: US 11,113,862 B1
(45) Date of Patent: Sep. 7, 2021

(54) SIMULATING MOTION OF COMPUTER SIMULATION CHARACTERS TO ACCOUNT FOR SIMULATED INJURIES TO THE CHARACTERS USING CURRENT MOTION MODEL

(71) Applicant: Sony Interactive Entertainment Inc., Tokyo (JP)

(72) Inventors: Michael Taylor, San Mateo, CA (US); Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/872,242

(22) Filed: May 11, 2020

(51) Int. Cl.
*G06T 13/40* (2011.01)
*G06T 13/80* (2011.01)

(52) U.S. Cl.
CPC .............. *G06T 13/80* (2013.01); *G06T 13/40* (2013.01)

(58) Field of Classification Search
CPC .............. G06T 13/40; G06T 11/00–80; G06T 13/00–80; G06T 15/00–87; G06T 17/00–30; G06T 2213/00–12
See application file for complete search history.

(56) References Cited

U.S. PATENT DOCUMENTS

| | | | | |
|---|---|---|---|---|
| 8,538,736 B1* | 9/2013 | Paquet | ................... | G06T 13/40 703/6 |
| 9,205,887 B2* | 12/2015 | Dariush | ................ | B25J 9/1697 |
| 10,497,163 B1* | 12/2019 | Sachania | ................. | A63F 13/52 |
| 10,896,534 B1* | 1/2021 | Smith | ....................... | G06N 3/08 |
| 2010/0197391 A1* | 8/2010 | Geiss | ................. | G06K 9/00369 463/30 |
| 2012/0143374 A1* | 6/2012 | Mistry | ................. | B62D 57/032 700/259 |
| 2013/0127873 A1* | 5/2013 | Popovic | .................. | G06T 13/40 345/473 |
| 2013/0222433 A1* | 8/2013 | Chapman | ................ | G06T 13/40 345/660 |
| 2016/0335793 A1* | 11/2016 | Rose | ....................... | G06T 13/40 |
| 2017/0032560 A1* | 2/2017 | Dionne | ................... | G06T 19/20 |
| 2018/0068482 A1* | 3/2018 | Yam | ........................ | G06T 13/80 |
| 2018/0303697 A1* | 10/2018 | Sulzer | ................. | A61H 1/0266 |
| 2019/0073826 A1* | 3/2019 | Bailey | ................... | G06T 17/205 |
| 2019/0122409 A1* | 4/2019 | Meadows | ............ | G06N 3/0454 |
| 2019/0295303 A1* | 9/2019 | Wrotek | .................... | G06T 13/20 |
| 2019/0295305 A1* | 9/2019 | Yang | ...................... | G06N 3/088 |
| 2019/0303658 A1* | 10/2019 | Ando | ....................... | G06N 3/08 |
| 2019/0304157 A1* | 10/2019 | Amer | .................... | G06N 3/0454 |
| 2020/0005138 A1* | 1/2020 | Wedig | .................. | G06N 3/0481 |

(Continued)

OTHER PUBLICATIONS

US 10,986,534 B2, 01/2021, Smith et al. (withdrawn)

(Continued)

*Primary Examiner* — Phong X Nguyen
(74) *Attorney, Agent, or Firm* — John L. Rogitz (57) ABSTRACT

An injury to a computer game character is simulated by changing the length or weight of an injured body part, or by adding additional links to the skeleton of the character to make the character harder to control. The facial expression of the character also can change. A generative adversarial network (GAN) may be used to learn motion under circumstances of injury to better mimic motion of an injured human as may be derived from, e.g., motion capture (MOCAP) video.

20 Claims, 5 Drawing Sheets

(56) References Cited

U.S. PATENT DOCUMENTS

| | | | |
|---|---|---|---|
| 2020/0134898 A1* | 4/2020 | Sheth | G06T 19/00 |
| 2020/0193671 A1* | 6/2020 | Tamir | G06T 7/251 |
| 2020/0265294 A1* | 8/2020 | Kim | G06T 13/00 |
| 2020/0388065 A1* | 12/2020 | Miller, IV | G06T 13/40 |
| 2020/0410736 A1* | 12/2020 | Lu | G06F 17/16 |

OTHER PUBLICATIONS

Meredith et al., Adapting Motion Capture Data Using Weighted Real-Time Inverse Kinematics, 2005 (Year: 2005).*

"International Search Report and Written Opinion" dated Jun. 22, 2021 from the counterpart PCT application PCT/US21/031749.

* cited by examiner

FIG. 6   Alter length

FIG. 7   Alter weight

FIG. 8   Add link

FIG. 9

Reduce joint limit of motion

FIG. 10

Change facial expression

SIMULATING MOTION OF COMPUTER SIMULATION CHARACTERS TO ACCOUNT FOR SIMULATED INJURIES TO THE CHARACTERS USING CURRENT MOTION MODEL

FIELD

The present application relates to technically inventive, non-routine solutions that are necessarily rooted in computer technology and that produce concrete technical improvements.

BACKGROUND

In computer simulations such as a computer games, game characters may experience injury. To animate such injuries, the game engines typically access "injury" animation sequences that are separate from the motion model used for non-injured characters and that must be pre-authored by game developers.

SUMMARY

Present principles are directed to producing animations of injured computer simulation characters using the same motion model used for non-injured characters.

Injured movement can be simulated using machine learning (ML). Constraints may be imposed on joints of rigid bodies that serve as character models and the length and/or weight of links in the rigid bodies (emulating body parts) may be varied in response to an emulated injury to simulate injury of in-game character animations. The character attempts to match a demanded walk cycle, but with an injury.

A generative adversarial network (GAN) may be used that maximizes a reward function. The GAN may attempt to match a human character simulating an injury and captured using motion capture (MOCAP) character. Reinforcement training can be used before and during play of the computer game. The game character should not put weight on an injured leg for example. An injury to a leg may be emulated by assigning feet a heavier weight or by depriving the player of control over the leg. The facial reaction of the game character may change to emulate pain or distress. The importance of weighting of a link may be reduced during GAN learning. Additional links may be added to the character model to make the character harder for the player to control. A negative reward may be applied when pressure is place on an injured link. The joint limits of a parent joint of an injured link and/or the joint limits of the entire joint chain leading to the injured link may be reduced.

The GAN may use Inverse Reinforcement learning to learn a reward function that matches the true movement of an injured person as closely as possible as indicated by, e.g., a MOCAP video. Uninjured motion may be re-targeted to the skeleton about and then the injury applied using the techniques herein after the motion has been learned.

Accordingly, in one aspect an apparatus includes at least one processor programmed with instructions which are executable by the at least one processor to identify in a computer simulation comprising at least one character an injury to the character, and alter one or more of: a weight of a simulated limb of the character, a length of a simulated limb of the character, a number of links in a skeleton of the character to cause an animation of the character to mimic motion of an injured human.

In some examples, the instructions may be executable to execute a generative adversarial network (GAN) to learn how to cause the animation of the character to mimic motion of an injured human. In such examples the instructions may be executable to use negative reward in the GAN responsive to pressure being simulated to be put on an injured limb of the character. With greater specificity, a negative reward may be applied as part of the reinforcement learning (RL) process. A GAN may be used to compare the human to the simulated character, and the generator an RL network alters the reward based on the discriminator feedback, with the negative reward is applied inside of the RL reward function, which may be regarded as being inside of the GAN.

The instructions may be executable to train the GAN using motion capture (MOCAP) video. In non-limiting implementations the instructions are executable to alter a facial expression of the character responsive to the injury.

A computer simulation console may implement the processor. In addition, or alternatively, a computer server may implement the processor.

In another aspect, an assembly includes a processor programmed with instructions executable to configure the processor to receive indication of an injury to a character in a computer simulation. The instructions are executable to apply at least a portion of a generative adversarial network (GAN) to alter animation of the character in response to the injury.

In another aspect, a method includes inputting to at least one neural network video of a person moving as if injured to train the neural network and using the neural network to alter animation of a computer simulation character responsive to a simulated injury of the character.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C'") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Figure 1:
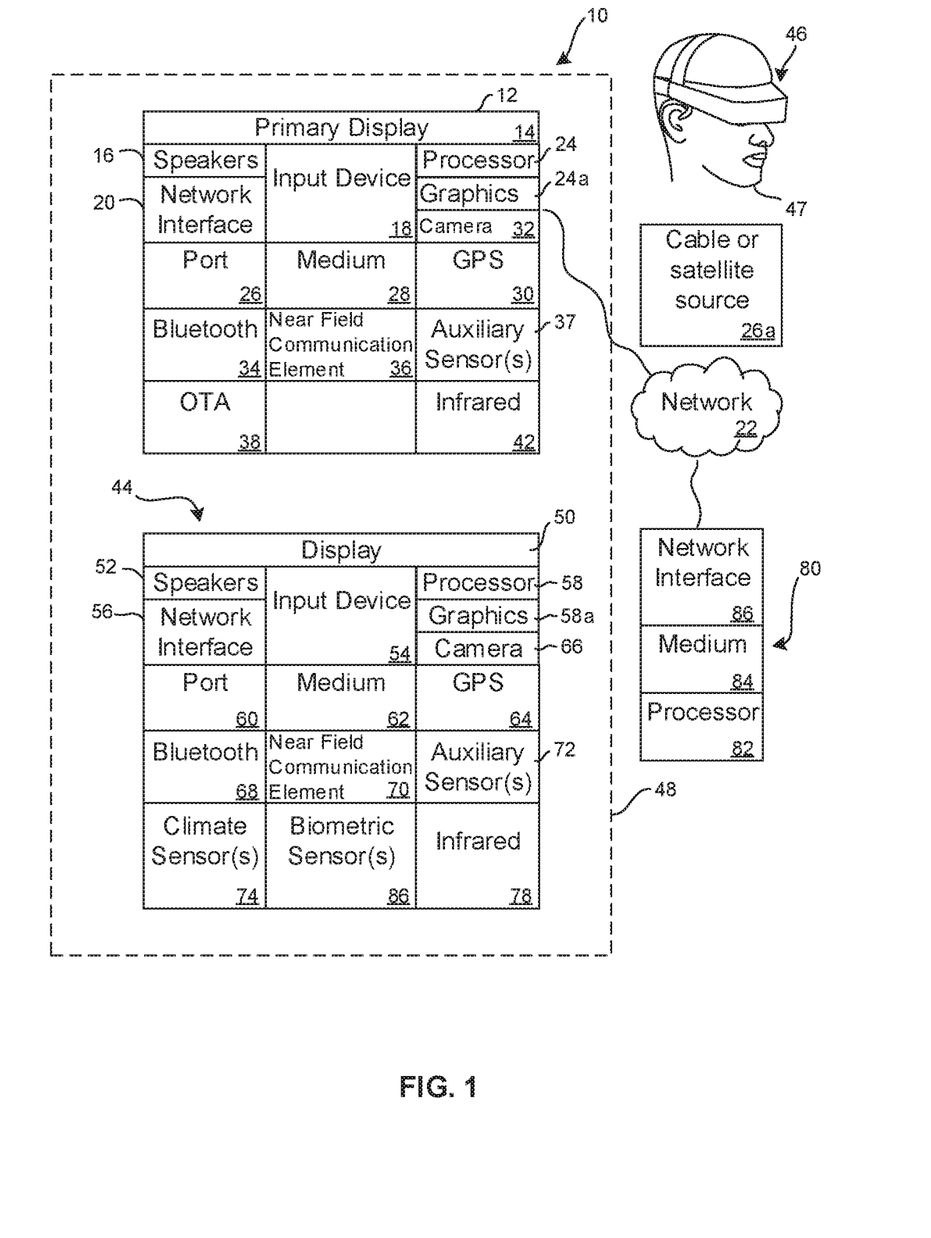
FIG. 1 is a block diagram of an example system consistent with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
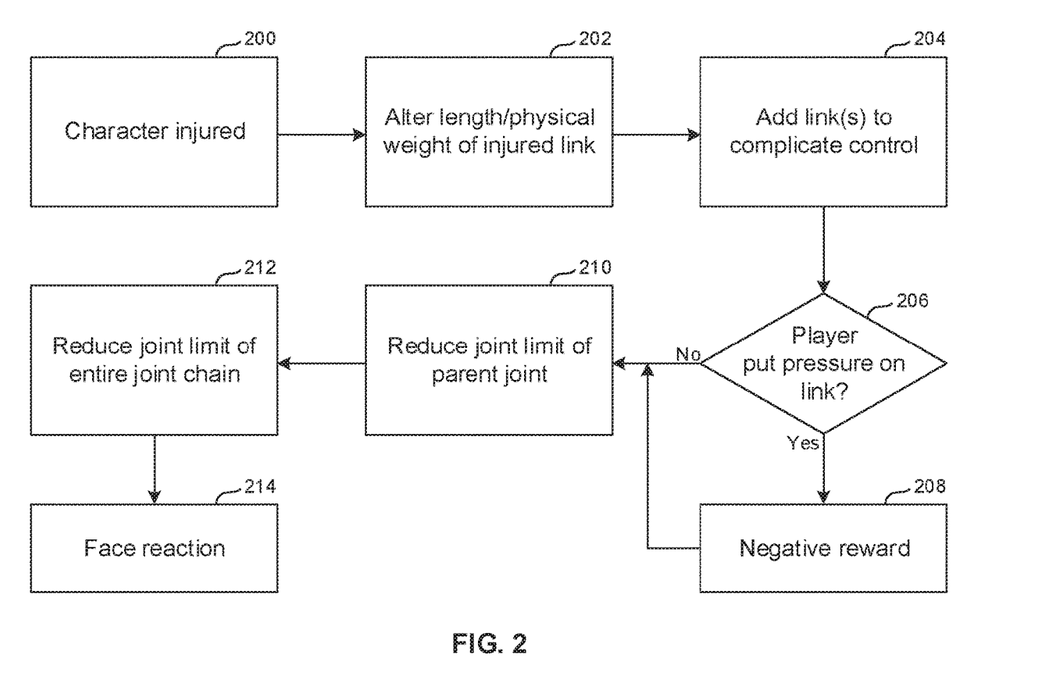
FIG. 2 illustrates example logic in example flow chart format for simulating an injury to a computer simulation character.

Example logic for simulating injuries to computer simulation characters such as video game characters is shown in FIG. 2. Commencing at block 200, a character is injured in accordance with game play. Ensuing blocks illustrate various techniques that may be used alone or in combination to alter control and configuration of the character to account for the injury in a realistic way.

For example, at block 202 a length or weight of an injured limb (represented in typical simulation physics engines by a rigid link connected to one or more movable joints) may be increased to make it harder to control for, e.g., a player attempting to move the character in accordance with a demanded walk cycle. Block 204 indicates that one or more links may be added to the skeleton of the injured character to complicate control of the injured character.

Moving to decision diamond 206, it may be determined whether under processor or player control an injured character attempted to place weight on an injured limb, and if so negative reward may be fed back to a machine learning engine such as the below-described GAN at block 208. From decision diamond 206 or from block 208 the logic may proceed to block 210 to reduce the limit of motion of a joint associated with the injured link, again to simulate reduced movement capability of the character owing to the injury. Or, as indicated at block 212 the limits of motion of all joints in a chain of joints starting with the injured link may be reduced. The facial expression of the character may be altered at block 214 in response to the injury. For example, the character may be made to grimace in response to an injury.

Figure 3:
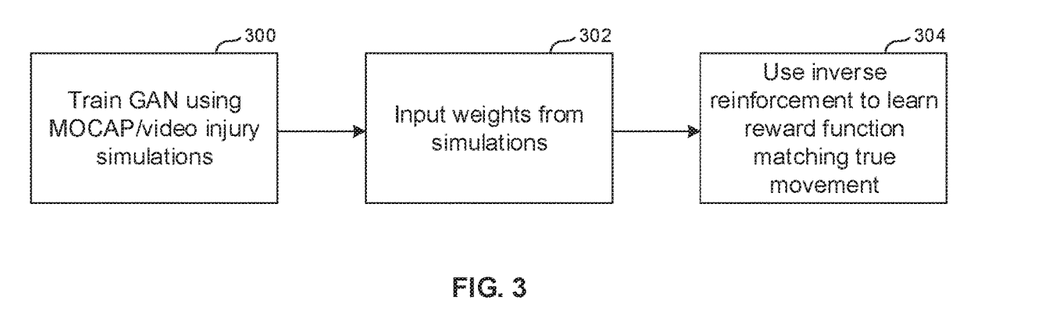
FIG. 3 illustrates example logic in example flow chart format for use of a GAN.

FIG. 3 illustrates logic for training a machine learning (ML) engine such as the below-described GAN. At block 300 the GAN may be initially trained using a training set for real world videos of humans acting as if injured. The human models may wear motion capture (MOCAP) suits to better track the bodies of the humans in the video.

From block 300 the logic moves to block 302 to input weights from various simulations. Essentially, results of injuries to characters during simulation play are fed back to the ML engine to enable the engine to continue to learn. Inverse reinforcement may be used at block 304 to learn a reward function that maximizes emulating true motion of real-world humans.

Figure 4:
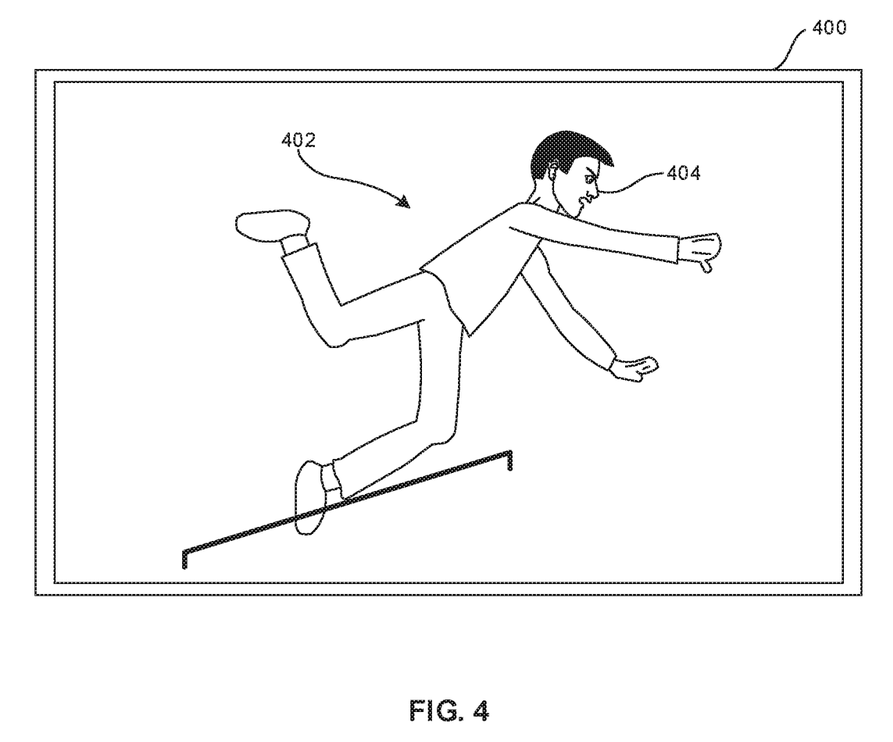
FIG. 4 illustrates an example screen shot of an injured computer game character.

FIG. 4 illustrates an example that may be presented on a display 400 such as any of the displays disclosed herein. A computer game character 402 is simulated to stumble forward and grimace as indicated at 404 in response to a simulated injury.

Figure 5:
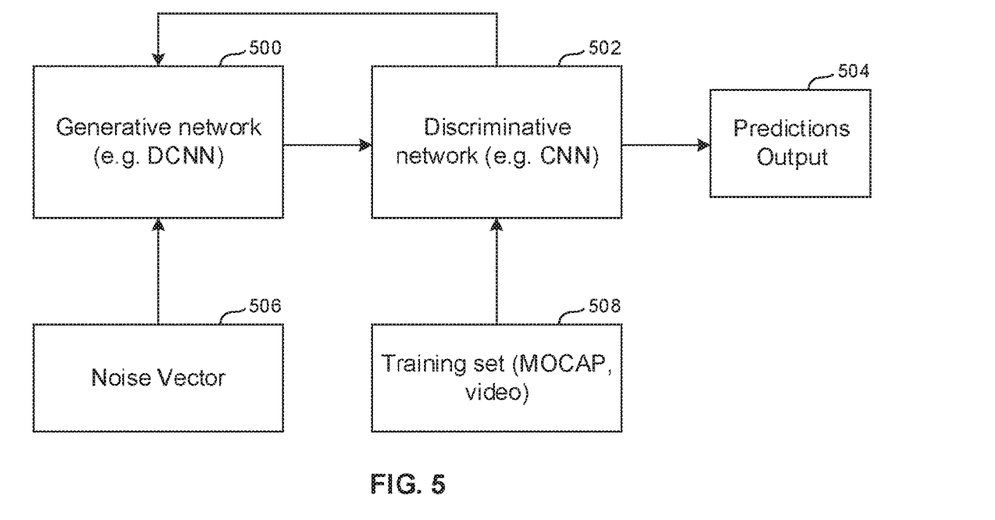
FIG. 5 illustrates an example GAN.

FIG. 5 illustrates an example GAN that may be used as a machine learning algorithm in accordance with present principles. The GAN includes a generative network 500 that may be implemented in non-limiting examples by a deconvolutional neural network (DCNN). The generative network 500 feeds data to a discriminative network 502 that may be implemented by a convolutional NN (CNN). In essence the generative network 500 attempts to fool the discriminative network 502, which outputs predictions 504 and feeds the predictions back to the generative network 500. Noise vectors 506 may be input to the generative network 500 while a training set 508 of ground truth human body reactions to imposed forces as established from videos of real-world humans including humans wearing motion capture (MOCAP) apparatus.

Note that the full GAN typically is used during learning, whereas at runtime (inference time), the trained network is applied, but in example implementations only the generator of the GAN is used, not the entire GAN.

Figure 6:
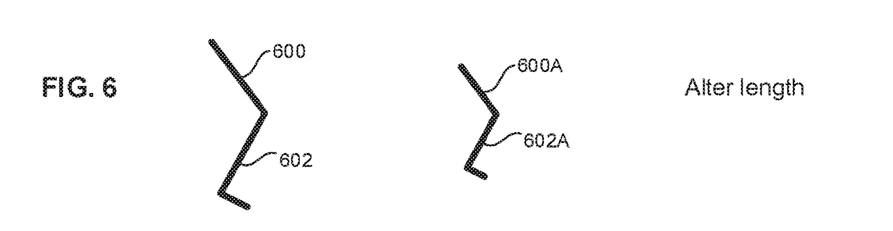
FIG. 6 illustrates simulating an injury by altering the length of a link.

FIGS. 6-10 provide further illustration of the above principles. In FIGS. 6-10, the left-hand figure represents a character body portion prior to injury and the right-hand figure represents the character body portion after injury. FIG. 6 illustrates two links 600, 602 representing the femur and tibia, respectively, of a simulation character in an uninjured condition on the left. After injury, as indicated in the right hand figure the lengths of the links have been changed, in the example shown, shortened as indicated at 600A, 602A.

Figure 7:
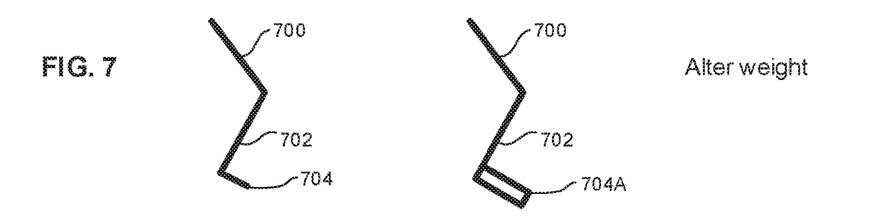
FIG. 7 illustrates simulating an injury by altering the weight of a link.

FIG. 7 illustrates two links 700, 702 representing the femur and tibia, respectively, of a simulation character in an uninjured condition on the left along with a foot 704. After injury, as indicated in the right hand figure the weight of the foot has been changed, in the example shown, increased as represented by the larger size foot 704A.

Figure 8:
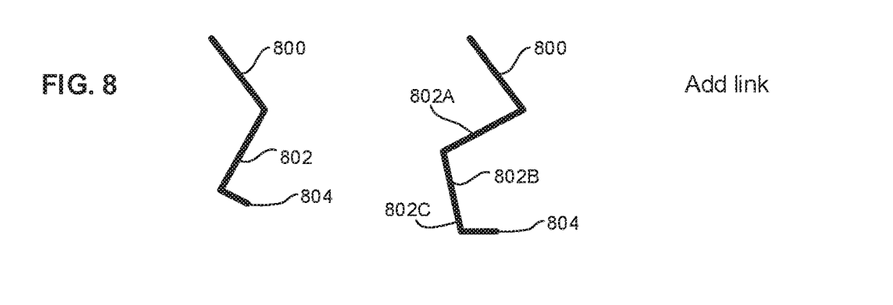
FIG. 8 illustrates simulating an injury by adding a link to the skeleton of a simulation character.

FIG. 8 illustrates two links 800, 802 representing the femur and tibia, respectively, of a simulation character in an uninjured condition on the left along with a foot 804. After injury, as indicated in the right hand figure the number of links has been changed, in the example shown, increased by breaking the tibia 802 into three links 802A, 802B, 802C.

Figure 9:
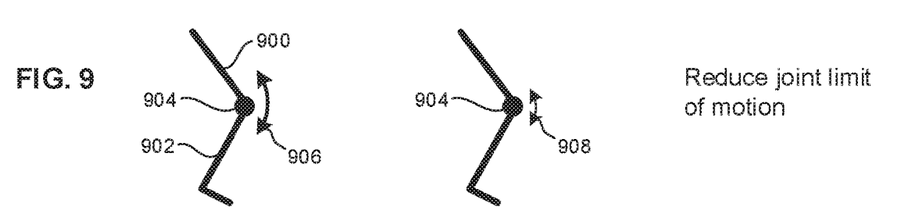
FIG. 9 illustrates simulating an injury by reducing motion limits of a joint.

Yet again, FIG. 9 illustrates two links 900, 902 representing the femur and tibia, respectively, of a simulation character in an uninjured condition on the left. FIG. 9 also illustrates a joint 904, in this case, the knee between the links 900, 902. Prior to injury, the knee has a first range of motion as indicated by the arrows 906.

After injury, as indicated in the right hand figure the joint 904 has a second range of motion as indicated by the arrows 908 that, in the example shown, is smaller than the uninjured range of motion 906.

Figure 10:
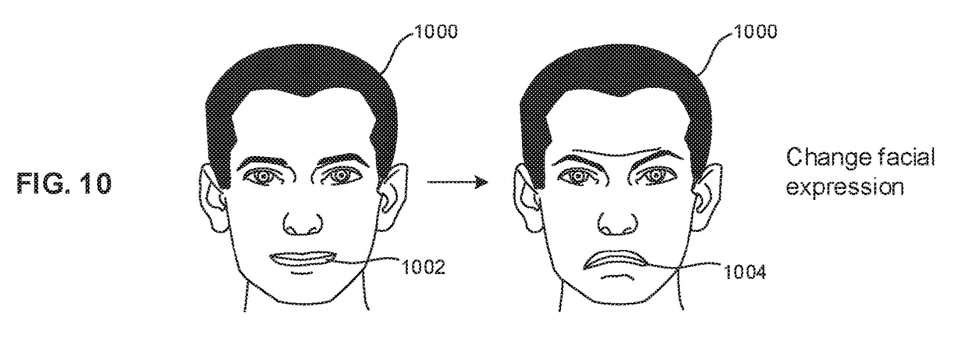
FIG. 10 illustrates simulating an injury by changing a facial expression of a computer simulation character.

FIG. 10 illustrates a face 1000 of a simulation character pre-injury having a first expression. In the example shown, the expression includes a smile 1002. After injury, the expression of the face 1000 has changed, in the example shown, to a grimace 1004 to indicate pain.

While particular techniques and machines are herein shown and described in detail, it is to be understood that the subject matter which is encompassed by the present invention is limited only by the claims.

What is claimed is:

1. An apparatus comprising:
   at least one processor programmed with instructions which are executable by the at least one processor to:
   identify in a computer simulation comprising at least one character an injury to the character; and
   alter at least one of: a body weight of a simulated limb of the character by increasing the body weight, a length of a simulated limb of the character, a number of links in a skeleton of the character to cause an animation of the character to mimic motion of an injured human.

2. The apparatus of claim 1, wherein the instructions are executable to:
   alter a body weight of a simulated limb of the character.

3. The apparatus of claim 1, wherein the instructions are executable to:
   alter a length of a simulated limb of the character.

4. The apparatus of claim 1, wherein the instructions are executable to:
   alter a number of links in a skeleton of the character.

5. The apparatus of claim 1, wherein the instructions are executable to:
   execute a generative adversarial network (GAN) to learn how to cause the animation of the character to mimic motion of an injured human.

6. The apparatus of claim 5, wherein the instructions are executable to:
   use negative reward in the GAN responsive to pressure being simulated to be put on an injured limb of the character.

7. The apparatus of claim 5, wherein the instructions are executable to:
   train the GAN using motion capture (MOCAP) video.

8. The apparatus of claim 1, wherein the instructions are executable to:
   alter a facial expression of the character responsive to the injury.

9. The apparatus of claim 1, comprising a computer simulation console implementing the processor.

10. The apparatus of claim 1, comprising a computer server implementing the processor.

11. An assembly comprising:
    a processor programmed with instructions executable to configure the processor to:
    receive indication of an injury to a character in a computer simulation; and
    alter at least one of: a simulated body weight of a simulated limb of the character by increasing the simulated body weight, a length of a simulated limb of the character, a number of links in a skeleton of the character to cause an animation of the character in response to the injury to the character.

12. The assembly of claim 11, wherein the instructions are executable to:
    apply a generator of a generative adversarial network (GAN) to alter animation of the character in response to the injury.

13. The assembly of claim 11, wherein the instructions are executable to:
    alter a simulated body weight of a simulated limb of the character in response to the injury to the character.

14. The assembly of claim 11, wherein the instructions are executable to:
    alter a length of a simulated limb of the character in response to the injury to the character.

15. The assembly of claim 11, wherein the instructions are executable to:
    alter a number of links in a skeleton of the character in response to the injury to the character.

16. The assembly of claim 12, wherein the instructions are executable to:
    use negative reward for training the GAN responsive to pressure being simulated to be put on an injured limb of the character.

17. The assembly of claim 12, wherein the instructions are executable to:
    train the GAN using motion capture (MOCAP) video.

18. The assembly of claim 11, wherein the instructions are executable to:
    alter a facial expression of the character responsive to the injury.

19. A method, comprising:
    inputting to at least one neural network video of a person moving as if injured to train the neural network; and
    using the neural network to alter animation of a computer simulation character responsive to a simulated injury of the character at least in part by altering a simulated body weight of at least a portion of the character by increasing the simulated body weight, or altering a length of a limb of the character, or altering a number of links in a skeleton of the character, or combinations thereof.

20. The method of claim 19, wherein the neural network comprises at least one generative adversarial network (GAN).

\* \* \* \* \*